United States Patent
Farrier et al.

(10) Patent No.: US 11,720,394 B2
(45) Date of Patent: Aug. 8, 2023

(54) AUTOMATIC CODE PATH DETERMINATION

(71) Applicant: Microsoft Technology Licensing, LLC, Redmond, WA (US)

(72) Inventors: Andrew Heth Farrier, Redmond, WA (US); Danny Chen, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 17/307,358

(22) Filed: May 4, 2021

(65) Prior Publication Data
US 2022/0357978 A1    Nov. 10, 2022

(51) Int. Cl.
| | |
|---|---|
| *G06F 9/44* | (2018.01) |
| *G06F 9/46* | (2006.01) |
| *G06F 11/30* | (2006.01) |
| *G06F 11/32* | (2006.01) |
| *G06F 11/34* | (2006.01) |

(52) U.S. Cl.
CPC ............ *G06F 9/461* (2013.01); *G06F 11/302* (2013.01); *G06F 11/323* (2013.01); *G06F 11/3495* (2013.01)

(58) Field of Classification Search
None
See application file for complete search history.

(56) References Cited

U.S. PATENT DOCUMENTS

| | | | | |
|---|---|---|---|---|
| 6,349,406 B1* | 2/2002 | Levine | ............... | G06F 11/3466 |
| | | | | 717/128 |
| 10,318,332 B2* | 6/2019 | Mola | ................... | G06F 11/3636 |
| 2005/0081206 A1* | 4/2005 | Armstrong | .......... | G06F 11/3612 |
| | | | | 714/E11.207 |
| 2009/0319996 A1* | 12/2009 | Shafi | ....................... | G06F 8/314 |
| | | | | 717/125 |
| 2017/0250890 A1* | 8/2017 | Puls | .................... | G06F 11/3688 |
| 2018/0373617 A1* | 12/2018 | Gaier | .................. | G06F 11/3616 |
| 2020/0272555 A1* | 8/2020 | Richardson | ......... | G06F 11/3612 |
| 2023/0004478 A1* | 1/2023 | Susman | .............. | G06F 11/3636 |

OTHER PUBLICATIONS

"PIX on Windows", Retrieved from: https://web.archive.org/web/20210224063745/https://devblogs.microsoft.com/pix/, Feb. 24, 2021, 4 Pages.

"International Search Report and Written Opinion Issued in PCT Application No. PCT/US2022/024133", dated Jul. 13, 2022, 12 Pages.

* cited by examiner

*Primary Examiner* — Qamrun Nahar
(74) *Attorney, Agent, or Firm* — Rainier Patents, P.S.

(57) ABSTRACT

The discussion relates to automatically providing information about what code sequences contribute to a length of time a program takes to execute. One example can collect context switch and ready thread event tracing data from a program over a period of interest and identify time blocks of program threads from the period of interest. The example can distinguish individual time blocks that contribute to execution time for the period of interest from other individual time blocks that do not contribute to the execution time.

20 Claims, 12 Drawing Sheets

SYSTEM 100

AUTOMATIC CODE PATH DETERMINATION

BACKGROUND

Computer programs tend to be configured with various design parameters, such as rendering content at a specified frame rate, to achieve a functionality. In practice, the program may fail to satisfy the design parameters, such as the actual frame rate may be slower than the specified frame rate. There tends to be a single path through the program code that can be optimized to improve design parameters, such as frame execution times. Any work spent in other areas of the program code tends not to improve the frame time. Manual examination of the program code may identify why execution of the code is taking longer than the design parameters. However, this manual examination requires an expert to spend large amounts of time analyzing the code execution. Attempts to automate this process have produced underwhelming results. The present concepts address these and/or other issues.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

Computer programs tend to be configured to achieve various design parameters, such as completing a functionality in a set amount of time. Frame rate is an example of such time constrained functionality. In practice, program execution may fail to satisfy the design parameters, such as the actual frame rate may be slower than the specified frame rate. There tends to be a single path through the program code that can be optimized to improve frame times and/or satisfy other design parameters. In this document, the path may be referred to as a critical path. In this context the term 'critical path' means the path that includes aspects that contribute to completion of the time constrained functionality, such as frame rate. Any work spent on other areas (e.g., those that are not in the critical path) of the program code tends not to improve the frame time. The present concepts provide techniques for calculating the critical path automatically from performance captures of the program.

From one perspective, the inventive concepts can automatically identify the critical path in a game or other program from performance captures of the game/program. The ability to identify the critical path can allow a developer to focus on areas for optimization efforts to improve the performance for time constrained functionality of programs such as games and simulators, among others.

Figure 1:
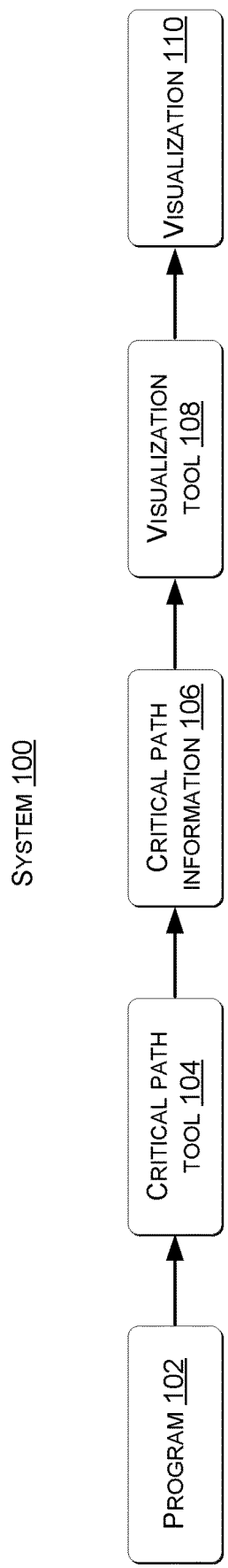
FIGS. 1 and 7 show example systems that can accomplish critical path concepts in accordance with some implementations.

Introductory FIG. 1 shows an example system 100 that can provide execution information to a user. In this case, a program 102, such as a game, simulation, or a modeling program can be analyzed by a critical path tool 104. The critical path tool 104 can identify context switches when multiple code segments are running on multiple processor cores. A context switch can be defined as the computing process of saving and restoring the state (e.g., context) of a CPU core such that multiple processes can share a single CPU core. For instance, the context switch can relate to when a thread starts or stops running. A processor may also have one or more CPU cores and the context switch can refer to when a thread stops running on one CPU core and starts to run on a different CPU core. Context switches are described in more detail below relative to FIGS. 3A-3C. The critical path tool 104 can utilize these context switches to generate critical path information 106. This can be manifest as information about processes related to the program 102 that contribute to a time segment of a period of interest of program execution. For instance, the processes can relate to execution of individual code segments and their inter-relationships to the execution of other code segments.

The critical path information 106 can be used by a visualization tool 108 to generate a visualization 110 that shows information about the program execution including the critical path information 106. Example visualizations 110 are described in more detail below relative to FIGS. 2A-2C. Example critical path tools 104 are described in more detail below relative to FIG. 7.

Figure 2A:
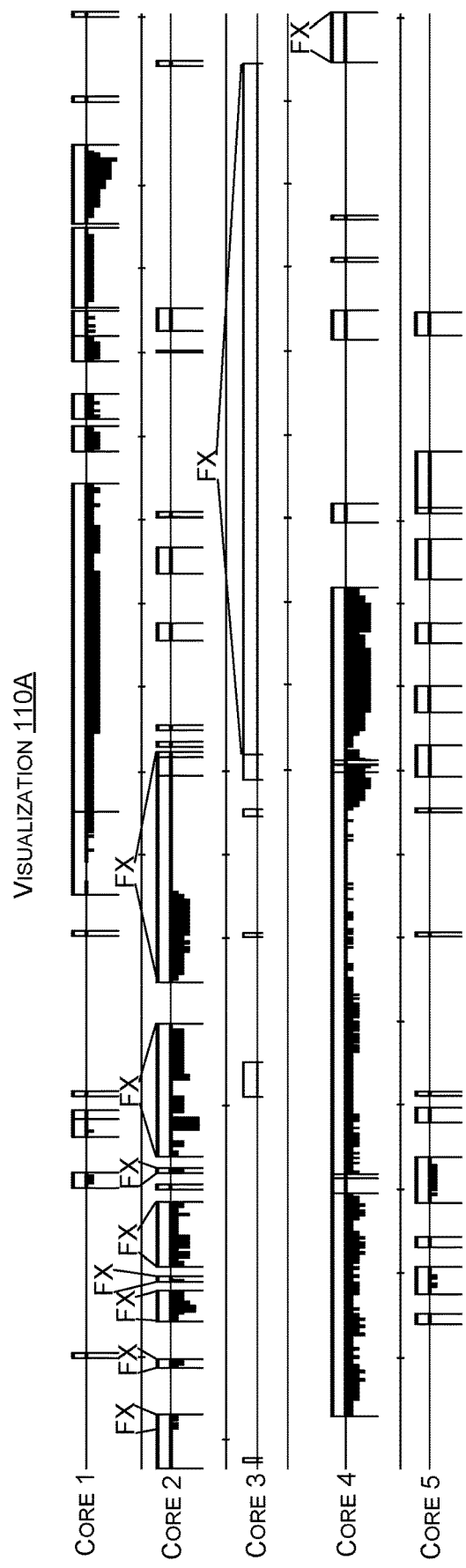
FIGS. 2A-2C show example visualizations that can be generated to convey critical path concepts in accordance with some implementations.
Figure 2B:
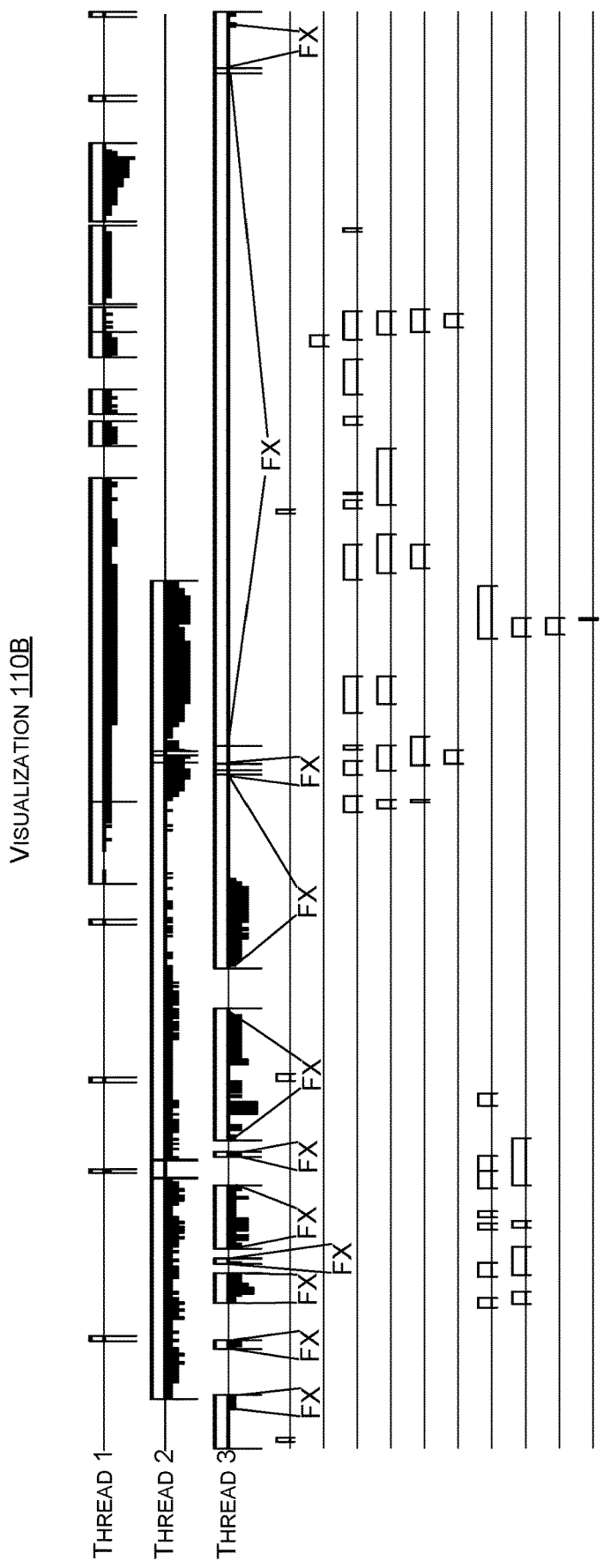
Figure 2C:
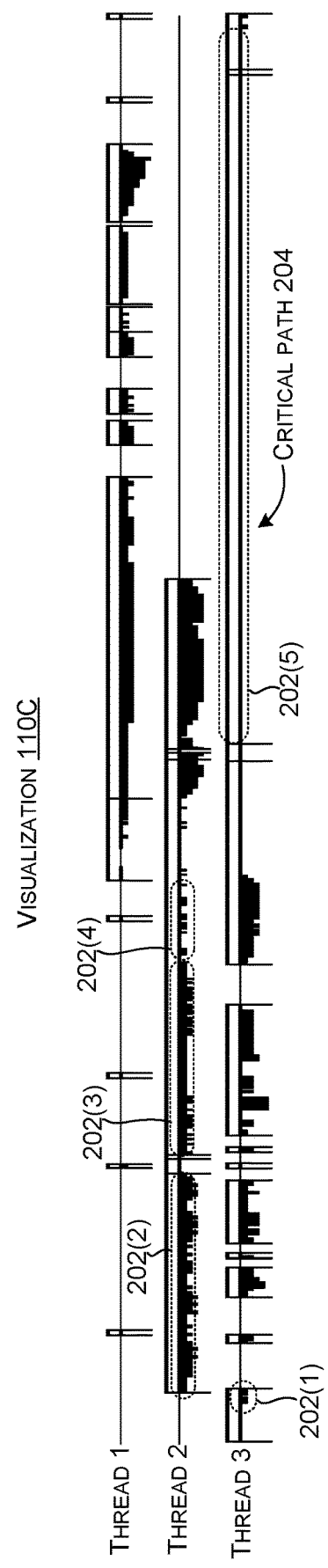

FIGS. 2A-2C collectively show example visualizations or graphical user interfaces (GUIs) that can be generated for the period of time by some implementations of the present concepts. The visualization can relate to a period that interests the user. For instance, the user may be interested in performance of a frame X (FX) and thus may select a period of interest starting with the start of frame X and ending with the end of frame X. Note these visualizations are conveyed with black and white line drawings and are somewhat simplified. Many visualizations employ color to convey additional information and/or are zoomable to provide a desired level of granularity and associated details. The skilled artisan will recognize that the explanation provided relative to the illustrated line drawings can be applied to other visualizations.

FIG. 2A shows a visualization 110A that shows code processes per processor core (e.g., central processing unit, "CPU" core) relating to frame X over a duration of time progressing from left to right. In this case cores 1-5 are shown because five cores fit on the drawing page at the illustrated level of granularity. The present concepts apply to any number of cores. All processes across the cores relating to frame X are visually indicated. In this case, the visual indication entails brackets. Other visual indications are contemplated. For instance, the processes relating to frame X could be highlighted with a specific color.

FIG. 2B shows a visualization 110B that shows processes per thread. A thread can be considered as a unit of scheduling and execution of work items. In this example, the work items are vertically distributed relative to the individual thread. In this case threads 1-3 are labelled on the drawing page, but the present concepts apply to any number of threads.

FIG. 2C shows another visualization 110C that is similar to visualization 110B. However, visualization 110C adds visual indications 202 of processes and context switches that when taken collectively represent a critical path 204. In this example, the visual indications 202 are manifest as dotted ellipses around the code segments of the critical path 204. Thus, the critical path 204 includes code that contributes to a time segment of the period (e.g., in this case frame X). Many different types of visualizations can be generated to show the critical path 204. A function of the visualization is to allow the user to readily identify which code sequences contribute to the critical path and which do not. For instance, the visual indications may include embedded information so that the user can hover over or enlarge an individual visual indication to receive additional information about the code that corresponds to that visual indication. For example, the user may be able to hover over an individual visual indication 202 and the information about the corresponding code segment and/or its inter-dependencies with other code segments and/or threads may be provided.

If the user wants to try to decrease the frame time, the user can use the visualization to readily distinguish the code sections that contribute to the critical path 204 from those that do not. The user can then modify the code sections (and/or those that they depend upon or otherwise inter-relate with) that contribute to the critical path in an attempt to decrease the frame time, for instance. In some cases, the visualization may provide links or inter-relationships between individual visual indications 202 so that the user can tell if an individual code segment relies upon input from another code segment. In such a case, the individual code segment cannot run until it receives the input. This can produce a delay in frame execution if the individual code segment is allocated processing resources, but is awaiting the input. The individual code segment may be part of the critical path and decreasing the input delay may decrease frame execution time.

As mentioned above, only changes to the code associated with the critical path 204 will reduce the overall time taken to complete frame X. Note that the critical path 204 can include context switches between various threads during this time. Example context switches are described below relative to FIGS. 3A-3C. Changes to code corresponding to the visual indications 202 can reduce frame duration. Changes to other code will not change the duration.

Figure 3A:
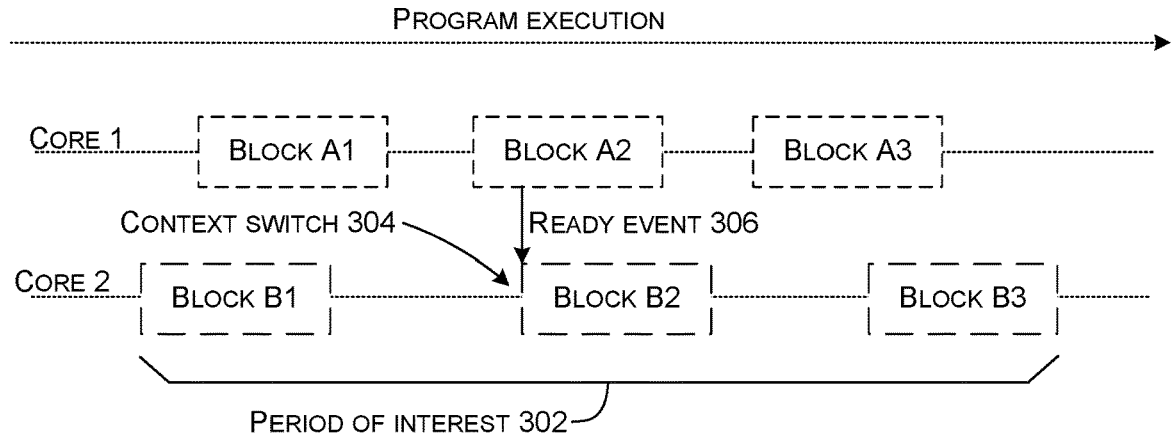
FIGS. 3A-3C show example scenarios that can relate to critical paths in accordance with some implementations.
Figure 3B:
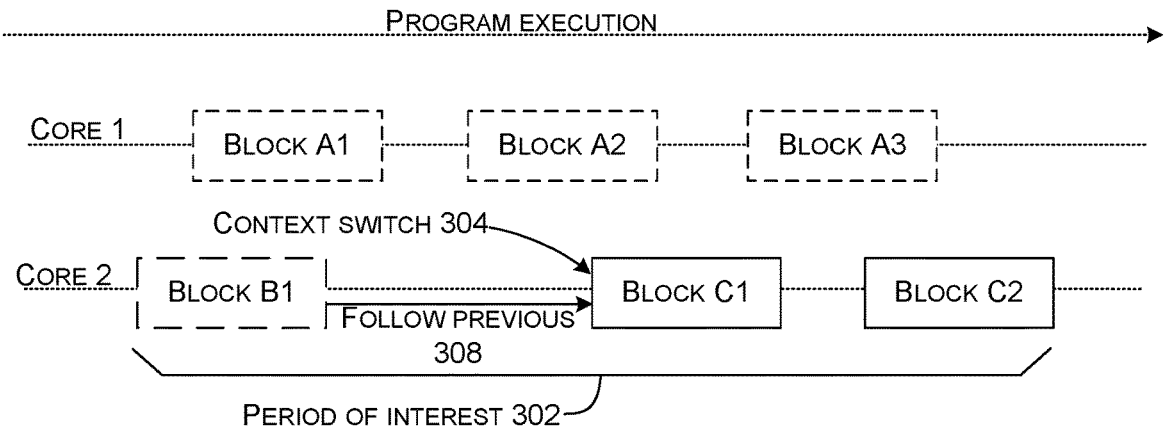
Figure 3C:
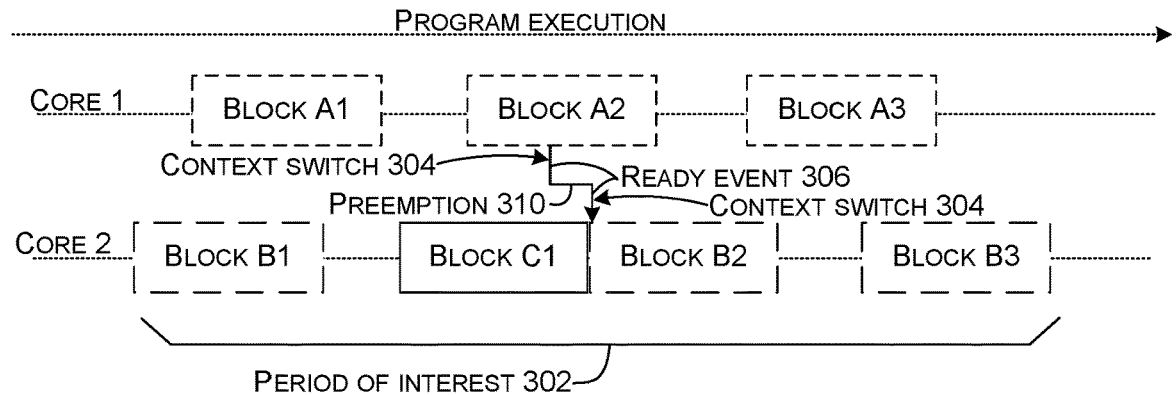

FIGS. 3A-3C collectively illustrate three example scenarios 300 that can be detected by the critical path tool to identify the critical path over a period of interest 302. In FIGS. 3A-3C each block represents a time range when a thread was running. Context switch 304 can relate to times when individual blocks start running or stop running. Blocks with the same letter suffix represent the same thread, and each horizontal row represents a single processor core.

FIG. 3A relates to a follow ready scenario 300A. In this case, block B2 was readied by block A2. Block B2 follows block B1 on core 2. However, block B2 was not allowed to run until a context switch 304 in the form of a ready event 306 is received from block A2. The ready event 306 happened in the middle of the time range that block A2 was running. Thus, the completion of block B2 is controlled by the time at which block A2 provides the ready event or ready event state 306. This aspect is described in more detail below relative to FIG. 4B.

FIG. 3B relates to a follow previous scenario 300B. In this case, block B1 was the previous thread running on the same core as block C1 (e.g., core 2). Block C1 cannot start until block B1 is finished (e.g., block C1 follows previous block B1 as indicated at 308). Thus, the completion of block C1 is dependent upon the completion of block B1 (e.g., follow ready state), which acts as a context switch 304. This aspect is described in more detail below relative to FIG. 4C.

FIG. 3C relates to a preemption scenario 300C. In this scenario, block A2 issues the ready event 306. At this point, block B2 could have been running on core 2, however block C1 was at a higher priority and preempting block B2 from running (e.g., preemption 310). Without preemption, the ready event would be a vertical line from block A2 to block B2 similar to FIG. 3A. However, preemption by block C1 delayed execution of block B2 and this preemption state is represented by the horizontal portion of the line (e.g., time duration) reflecting the difference (e.g., delay) between when the ready event allowed block B2 to proceed on core 2 and when it actually proceeded because of delay caused by block C1. Thus, the completion of block B2 is dependent upon the completion of block C1, and this preemption 310 is an example context switch 304. This aspect is described in more detail below relative to FIG. 4D.

In review, context switch examples are described above. The context switches can indicate a switch from one thread to another thread, data available is the old thread, the new thread, and optionally the thread that readied the new thread. This 'ready thread' can be viewed as the thread that indicates that a new thread is now allowed to run (e.g., whatever resource the new thread was waiting on has now been released). The context switch can indicate the change from old thread, to new thread, and optionally the ready thread. With a context switch, the 'from thread' is going to stop running and the 'ready thread' gives the 'to thread' permission to start running.

The critical path tool can leverage the context switches to provide useful information to the user about the critical path through the code that executes. For instance, the user can define aspects about the program they are interested in, such as a particular thread and/or a start and stop time. For example, relative to a game program the user may be interested in a simulation thread that performs the math for what the player does, performs the artificial intelligence (AI), etc. The user can pick a start time and an end time, such as the start of a frame and the end of a frame. The critical path tool can start at the end point and work its way backwards through those context switches to the start point. That creates a path between multiple threads as explained above relative to FIGS. 3A-3C.

For instance, the user may be interested in thread A, but thread A is not allowed to start until thread B is done. In that case, getting thread B to finish earlier can shorten the time to completion of the frame time. There may be thousands of context switches in a frame. The critical path tool can work its way back through all of them and can output these time points and these particular pieces of code that match all these time points. That combination is the critical path. From another perspective, the critical path can convey processes that contribute to a time segment between the start time and the end time. Only changing the pieces of code associated with the critical path can shorten the execution of the whole process to shorten the frame time.

In some cases, the critical path tool can output a list of timepoints that represent the critical path. Example visualizations that can be generated from this output information are illustrated above relative to FIG. 2C.

Figure 4A:
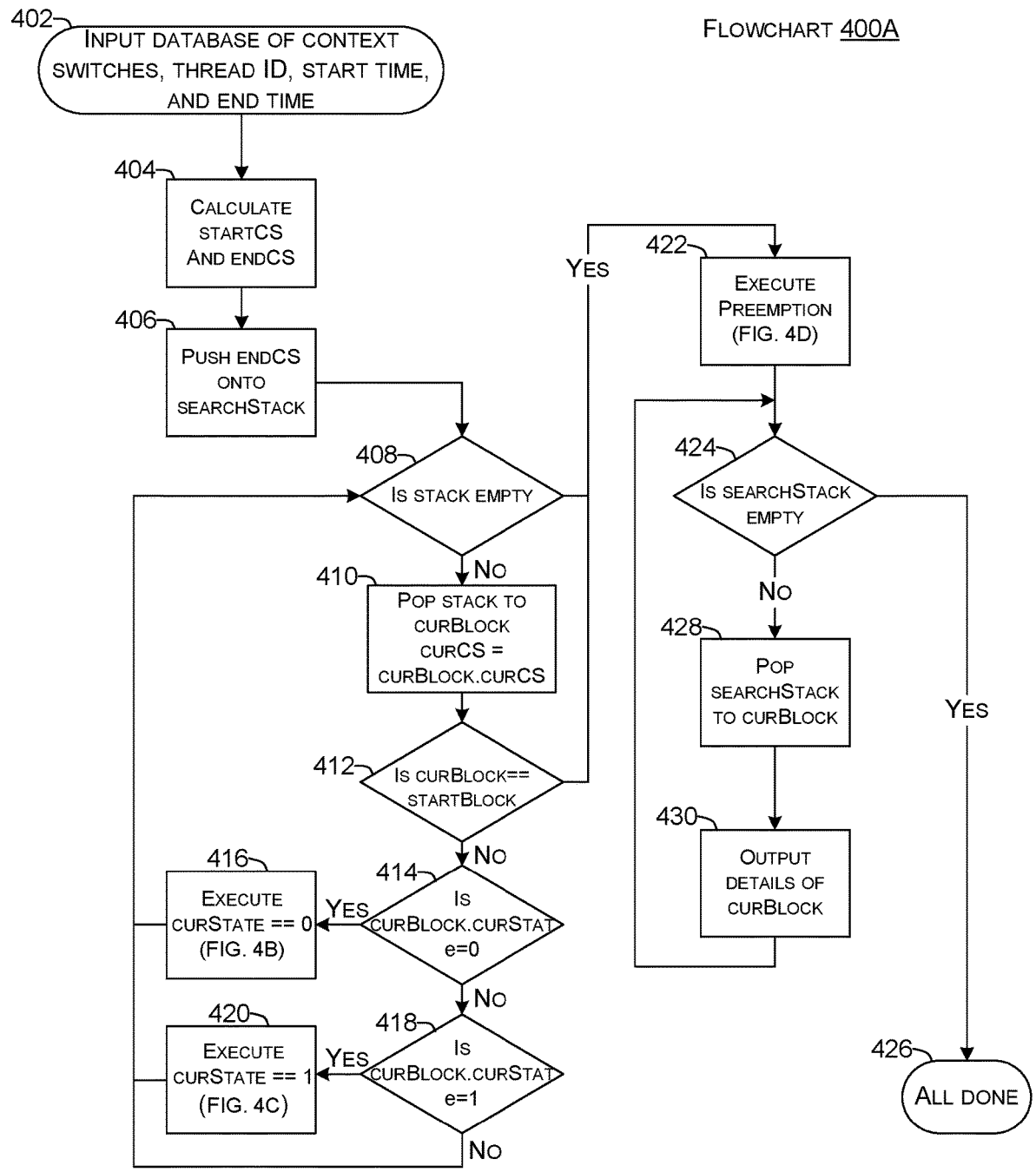
FIGS. 4A-4D, 5, and 6 show example flowcharts that can relate to critical path identification in accordance with some implementations.
Figure 4B:
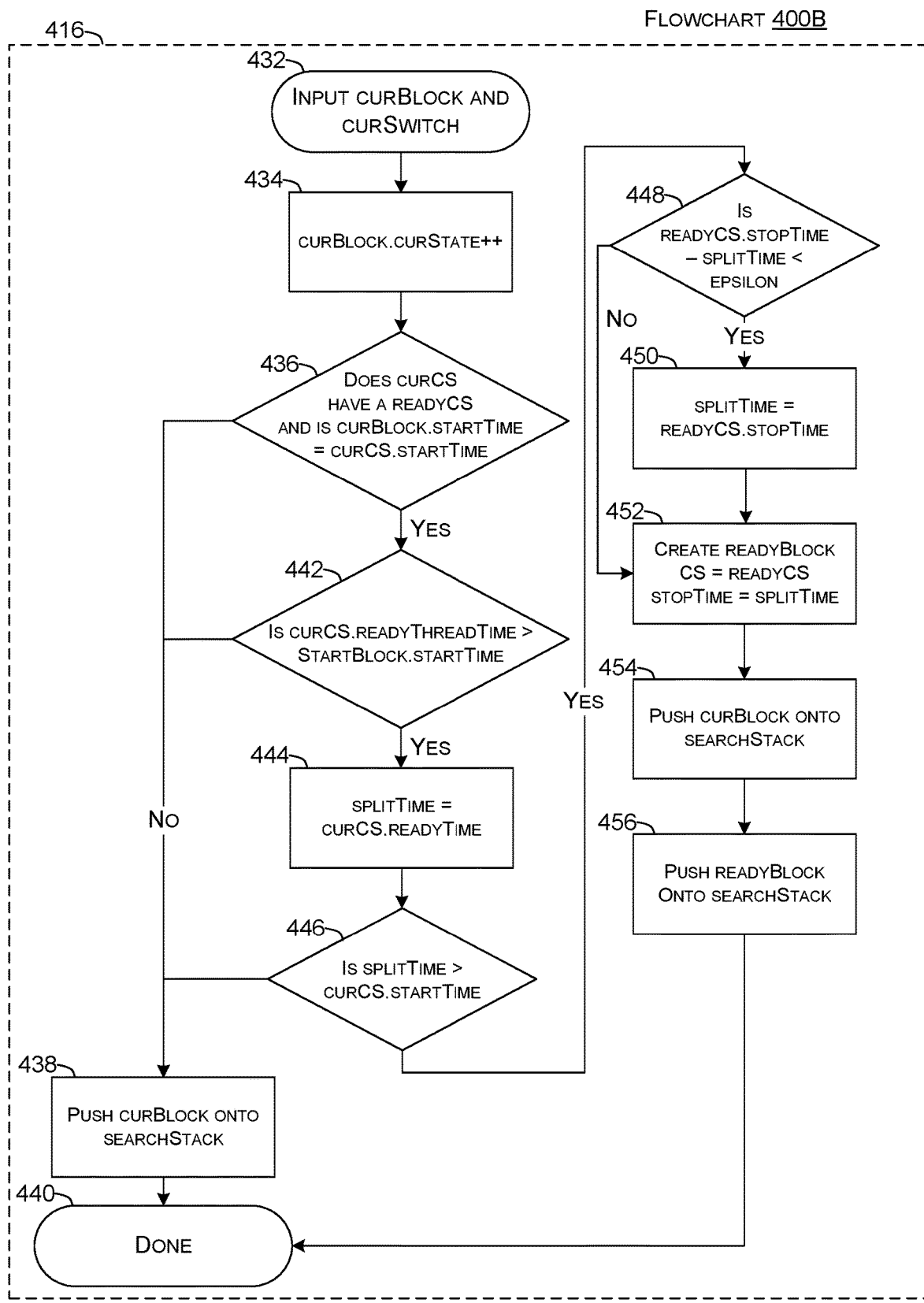
Figure 4C:
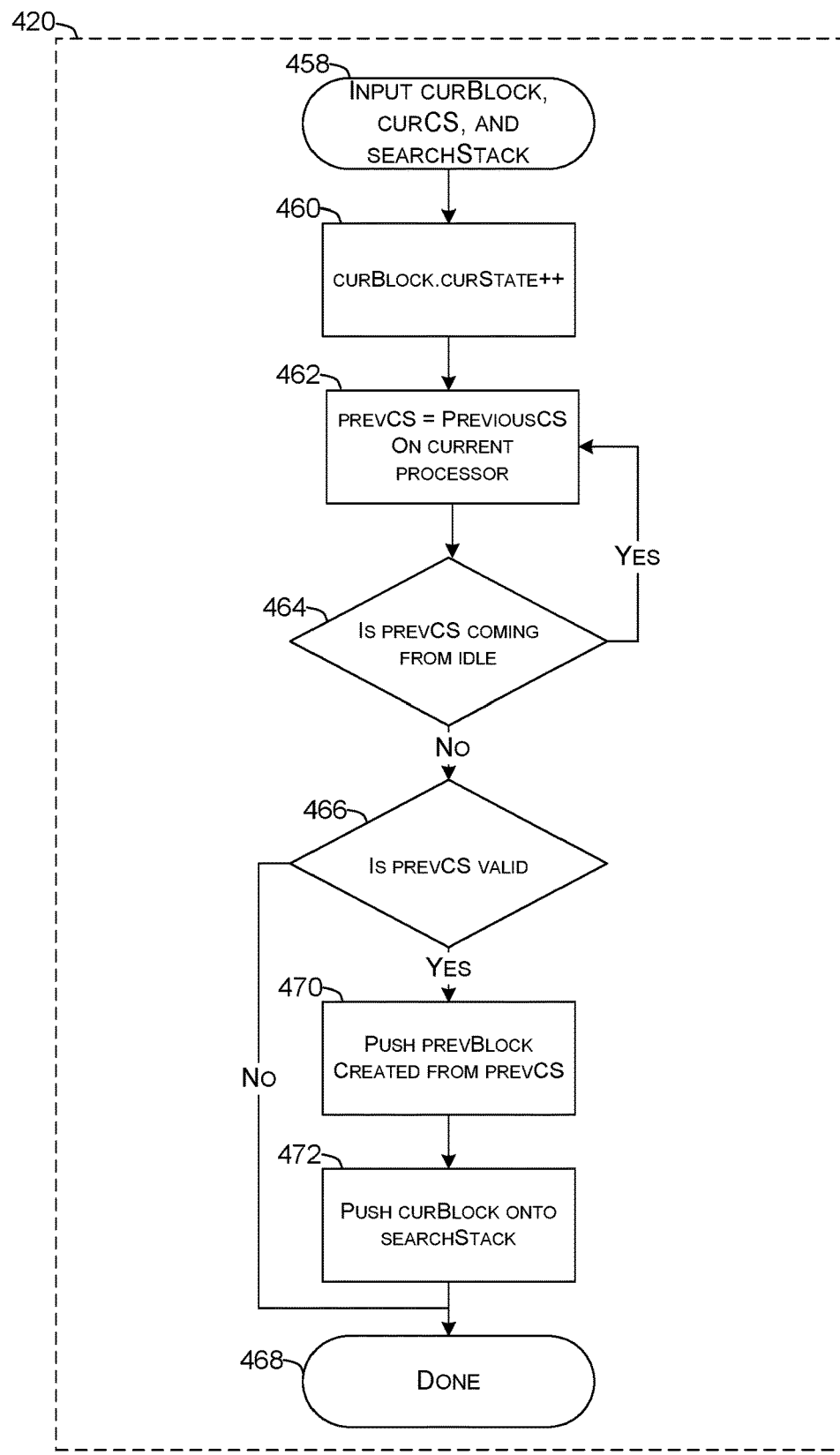
Figure 4D:
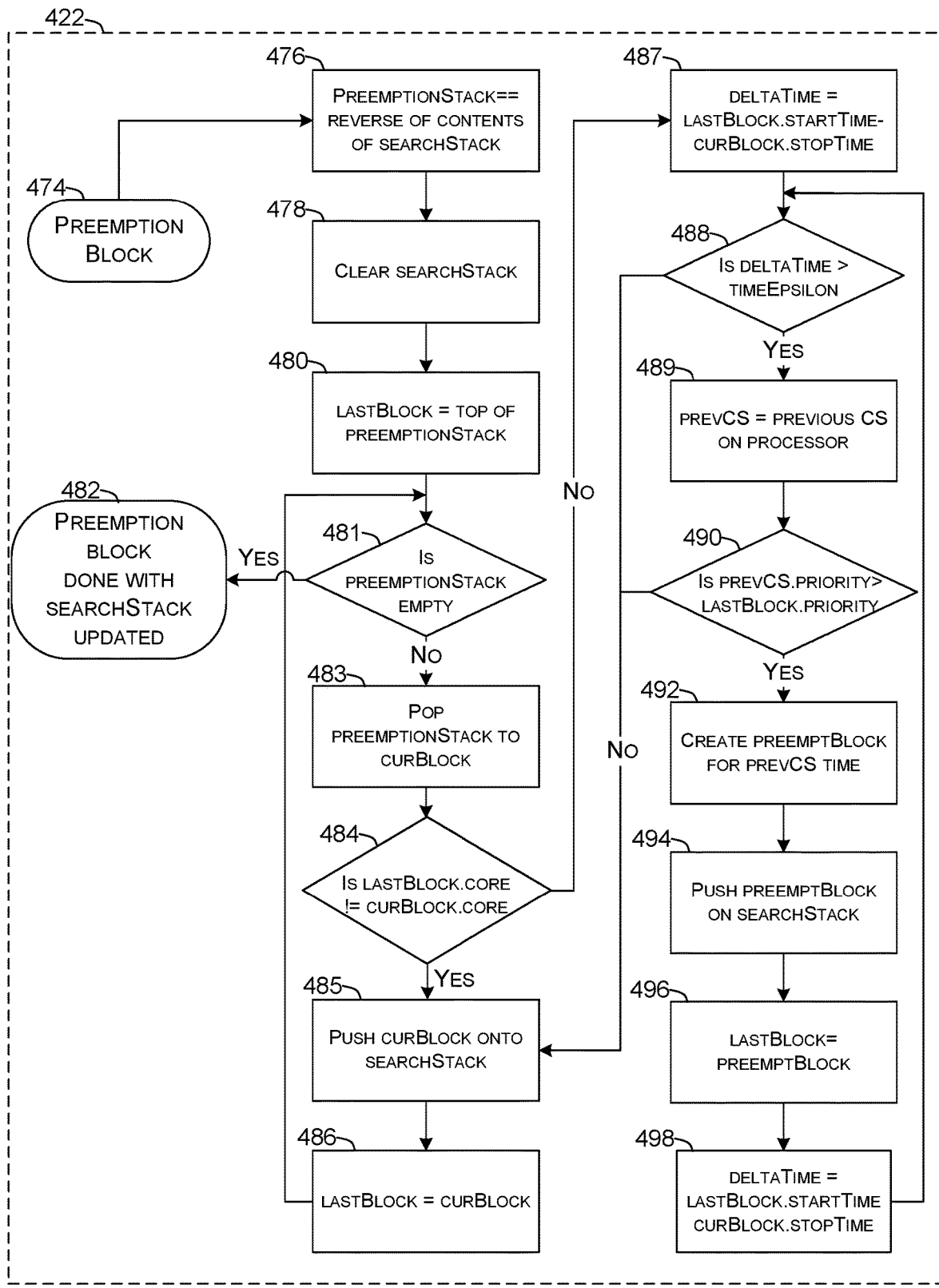

FIGS. 4A-4D collectively show example flowcharts 400 of a critical path algorithm that is consistent with the present concepts. FIG. 4A shows an overall flowchart 400A. FIGS. 4B-4D show flowcharts 400B-400D respectively, that expand upon individual aspects introduced relative to FIG. 4A.

On FIG. 4A, flowchart 400A can start at 402 with various input data, such as context switches, thread ID, start time and end time for a period of interest. In some cases, the user will decide the start time and the end time to define the period of interest. In some implementations, the various input data, context switches, and/or thread IDs can be obtained from or derived from operating system root data.

At 404, the process can calculate a start context switch (startCS) and an end context switch (endCS). The start context switch can be the first context switch in the period of interest and the stop context switch can be the last context switch in the period of interest.

At 406, the process can push the end context switch onto the search stack. This initializes the search stack for the algorithm.

At 408, the process can query whether the search stack is empty. If the search stack is empty, it means no potential critical path was found. If the search stack is not empty (e.g., no at 408), at 410 the process can pop the current block (curBlock) from the search stack so the current context switch (curCS) equals the current block. As used here, 'pop' means remove the most recently added element that was not yet removed.

At 412, the process can query whether the current block is the start block. If the current block is the start block that means a potential critical path has been found. If the current block is not the start block (e.g., no at 412) the process proceeds to block 414 and queries whether the current state is zero. If the current block does equal zero (e.g., yes at 414) at 416 the process executes current state equals zero. This aspect represents Scenario 300A shown in FIG. 3A and is described in more detail below relative to FIG. 4B. If the current block does not equal zero (e.g., no at 414) at 418 the process queries whether the current block's current state equals one. If the current block's current state does not equal 1, the process returns to block 408. If the current block's current state equals one (e.g., yes at 418) the process executes current state as one at 420. This aspect represents scenario 300B shown in FIG. 3B and is described in more detail below relative to FIG. 4C. At the completion of blocks 416 and 420, the process returns to block 408.

The above discussion addressed a 'no' answer at blocks 408 and 412. In the event of a 'yes' answer at either of these blocks a potential critical path has been found. The process proceeds to block 422 and executes preemption which represents the case shown in FIG. 3C and is discussed in more detail below relative to FIG. 4D.

After preemption the contents of the search stack represents the critical path and the next set of blocks output the details. At block 424, the process queries whether the search stack is empty. If the search stack is empty (e.g., yes at 424), the process is complete as indicated at block 426. If the search stack is not empty (e.g., no at 424) the process proceeds to block 428, which pops the search to the current block (curBlock). At block 430, the process outputs details of the current block and returns to block 424. The output is the list of blocks that represent the critical path.

FIG. 4B shows flowchart 400B that includes details of block 416 from FIG. 4A. Flowchart 400B starts at 432 by inputting the current block and the current switch. At 434 the process incrementally increases the value of the current block's current state by 1. At 436, the process queries whether the current context switch has a ready context switch (e.g., ready event) and is the current block start time equal to the current context switch start time. If no, the process progresses to block 438 where the process pushes the current block onto the search stack and then is done at 440. Since 434 incremented the current block's current state by 1 the next time the block is popped from the search stack at 410 the checks at 414 and 418 will be No and Yes respectively.

Looking again at block 436 if the current context switch has a ready context switch and the current block start time is equal to the current context switch start time (e.g., yes at 436) the process proceeds to block 442. This check represents if curBlock is currently part of the potential critical path. Block 442 queries whether the current context switch ready thread time is greater than the start block's start time. This block can function to identify and compensate for imprecise (or imperfect) data obtained from the operating system, such as when two consecutive events have out-of-order timestamps. If the current context switch ready thread time is less than the start block's start time (e.g., no at 442), the process goes to block 438 and finishes at 440. If the current context switch ready thread time is greater than the start block's start time then the process goes to block 444 and sets the split time equal to the current context switch ready time. The process then goes to block 446 and queries whether the split time is greater than the current context switch start time. If not, the process goes to blocks 438 and 440. If the split time is greater than the current context switch start time (e.g., yes at 446), then the process goes to block 448. Similar to block 442, block 446 can function to identify and compensate for imprecise (or imperfect) data obtained from the operating system.

Block 448 queries whether the ready context switch stop time minus the split time is less than epsilon. If yes, the process proceeds to block 450 and sets the split time equal to the ready context switch stop time. The process then proceeds to block 452. Looking again at block 448, if the ready context switch stop time minus the split time is not less than epsilon, the process skips block 450 and goes directly to 452. A value for epsilon can be selected so that the process can ignore insignificant differences (e.g., those less than epsilon and focus on significant differences (e.g., those greater than epsilon). The value selected for epsilon can be dependent upon the program being evaluated and the critical path.

Block 452 creates a ready block context switch where the stop time equals the split time. Block 452 can offer a second conditional around the start time where a block is split into several sub blocks. This process can start with a single time block such as Block A2 in FIG. 3A. Block 452 ends up creating two blocks, call them A2-first and A2-second, they are also contiguous in time. The time for the split is where the ready event is located and readyBlock represents A2-first. The second part of the conditional in 436 is checking if it's block A2-first or A2-second.

The process then proceeds to block 454 and pushes the current block on the search stack. Next, block 456 pushes the ready block onto the search stack. The process is then complete and ends at block 440.

FIG. 4C shows flowchart 400C that expands upon block 420 of FIG. 4A. Flowchart 400C starts at block 458 and inputs the current block, the current context switch, and the search stack. At block 460 the current state is incremented. The next time the block is popped from the search stack at 410 the checks at 414 and 418 will be No and No respectively. Block 462 sets prevCS as the previous context switch on the current processor. Block 464 queries whether the previous context switch is coming from idle. If the previous context switch is coming from idle (e.g., yes at 464) the process returns to block 462. This check is attempting to find the previous time the processor core was performing work. If the previous context switch is not coming from idle, the process queries at 466 whether the previous context switch is valid. If not (e.g., no at 466) then the process finishes at 468. If the previous context switch is valid, the process proceeds to block 470.

Block 470 pushes the previous block created from the previous context switch; this is the previous time work was being performed on the processor core. Block 472 pushes the current block onto the search stack and then the process is done at block 468.

FIG. 4D shows flowchart 400D that relates to preemption introduced by block 422 in FIG. 4A. The preemption process begins at block 474. Block 476 sets the preemption stack as the reverse of contents of the search stack. This converts the data from reverse chronological order to chronological order. The search stack is cleared at 478. At block 480, the last block now equals the top of the preemption stack. Block 481 queries whether the preemption stack is empty. If the preemption stack is empty (e.g., yes at 481) then at block 482 the preemption block is done and the search stack has been updated. If the preemption stack is not empty (e.g., no at 481) the process proceeds to block 483. Block 483 can pop the preemption stack to the current block.

Block 484 queries whether the last block's processor core is the current block's processor core. This checks if the two adjacent blocks in the potential critical path are on the same processor core. If the last block's processor core is the current block's processor core (e.g., yes at 484) then at block 485, the process pushes the current block onto the search stack. At block 486 the last block is set to the current block and the process returns to block 481.

Returning to block 484, if the query answer is no, the process proceeds to block 487. This represents that there may be possible preemption between the last block and the current block. Block 487 sets the delta time as the last block start time minus the current block stop time. Block 488 queries whether the delta time is greater than epsilon (introduced above relative to block 448). The purpose of this block is to distinguish significant time delay from insignificant (e.g., nominal) time delay. If the delta is not greater than epsilon (e.g., no at 488), the process returns to block 485. This represents there is currently no preemption. If delta is greater (e.g., yes at 488) the process proceeds to block 489, which sets the previous context switch equal to the previous context switch on the processor. This represents there is possible preemption.

The process then proceeds to block 490, which queries whether the previous context switch priority is greater than the last block priority. If not, the process returns to block 485. If the previous context switch priority is greater than the last block priority (e.g., yes at 490) then preemption has happened in the potential critical path. The process creates a preempt block for the previous context switch time at 492. Block 494 pushes the preempt block on the search stack. Block 496 assigns the last block as equal to the preempt block. Block 498 assigns delta time equal to the last block start time and the current block start time. The process then returns to block 488 to check for another potential preemption case.

As described above, FIGS. 4A-4D show example flowcharts that can accomplish at least some of the present concepts. The discussion directly below details an example algorithm that can accomplish at least some of the present concepts.

---

Collect context switch and ready thread operating system event
tracing data from a title.
Transform the collected data into two pieces.
    A set of blocks where each block represents the time a thread
    was executing.
    Timestamped link between two blocks for when Thread A
    readied Thread B
    Each block can be one of three 'states'
        Follow ready
        Follow previous
        Done
Calculate the start and stop blocks based on user supplied start
time and stop time.
Push stop block onto the 'Search' stack.
While (search stack is not empty)
    Pop top of search stack into curBlock
    If (curBlock == start block)
        push curBlock onto stack and exit loop
    Switch based on direction of curBlock
    Case Follow Ready
        set curBlock direction to Processed Ready thread data
        If (curBlock has ready thread data)
            Create new block using readied thread, it's start time, and
    stop time of the ready event
            Push curBlock onto search stack
            Push new ready block onto search stack
        else
            Push curBlock onto search stack
    Case Follow Previous data
        set curBlock direction to Done
        get the previous executing block on the same processor as
curBlock
        if (previous block)
            push previous block onto search stack
        push curBlock onto search stack
    Case Done
        Do nothing
Create new 'reverse' stack that is the reverse of search stack
Create new 'final' stack
Initialize lastBlock to top of reverse stack
while (reverse stack is not empty)
    Pop top of reverse stack into curBlock
    if (processor of curBlock and lastBlock are not equal)
        while (delta time between lastBlock start time and curBlock
    stop time > epsilon)
            Find previous block on processor from curBlock
            if (previous block priority > lastBlock priority)
                Create new preemptBlock using previous block
                Push preemptBlock onto final stack
                set lastBlock to preemptBlock
    Push curBlock onto final stack
    Set lastBlock to curBlock.

---

At this point the final stack contains a critical path as a series of time blocks between threads and processor cores. As mentioned previously, this information is useful to the user in this form and/or can be utilized to generate various visualizations.

Figure 5:
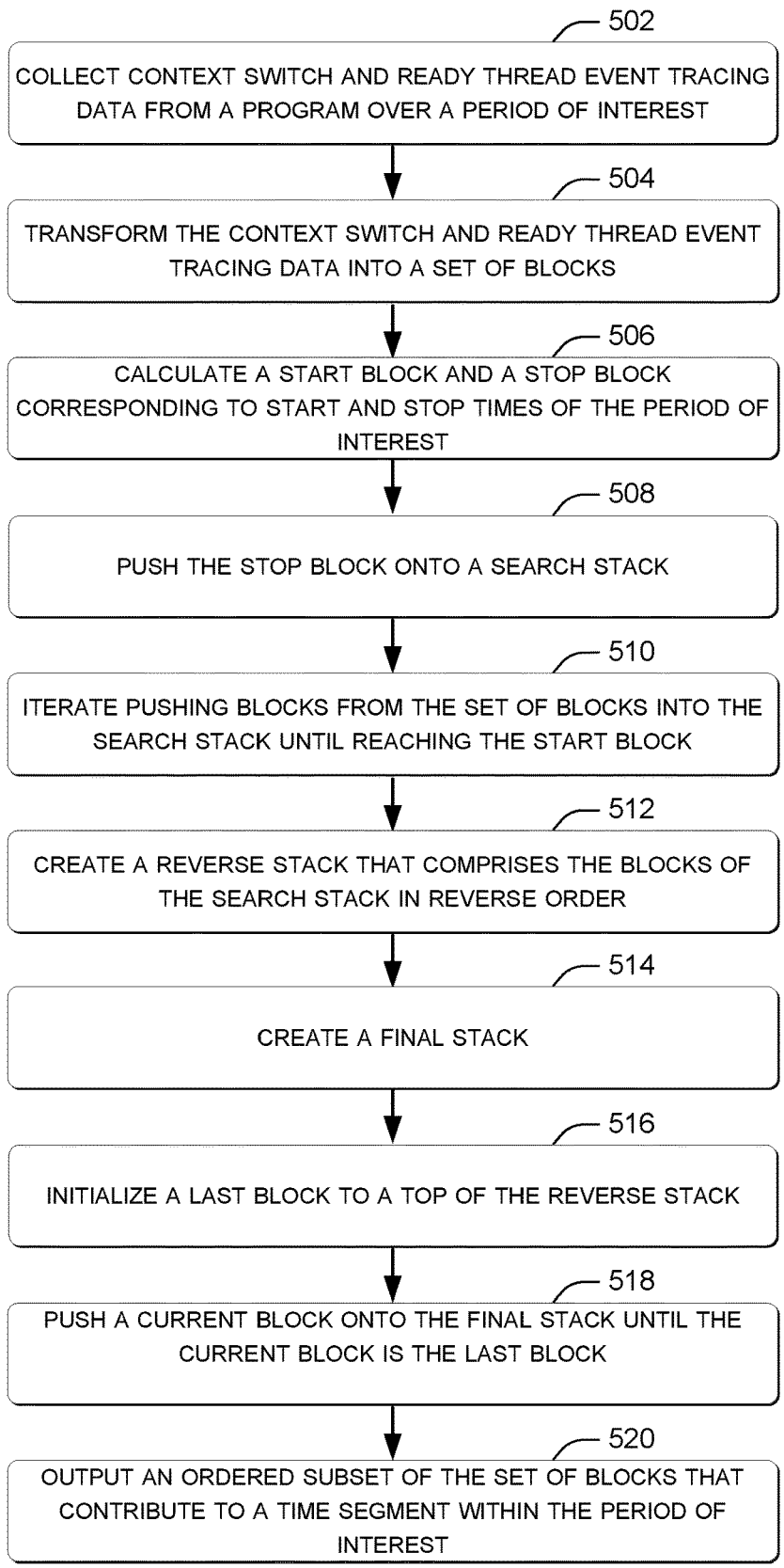

FIG. 5 shows a flowchart of a critical path technique or method 500.

At block 502 the method can collect context switch and ready thread event tracing data from a program over a period of interest. In some cases, the operating system may gather this data (e.g., operating system event tracing process). In some implementations, the user can define the period of interest. For instance, the period of interest may be a frame generated by the program. The user could identify the frame in various way, such as highlighting the frame in a visualization or selecting the frame start and stop times, among others.

At block 504 the method can transform the context switch and ready thread event tracing data into a set of blocks where individual blocks represent times that threads were executing and timestamped links between individual blocks when a first thread readied a second thread.

At block 506 the method can calculate a start block and a stop block corresponding to start and stop times of the period of interest. The process can then evaluate individual blocks to eventually categorize them as visited, processed ready thread, or processed dead (e.g., follow ready, follow previous, or done). This aspect can be accomplished below.

At block 508 the method can push the stop block onto a search stack.

At block 510 the method can iterate pushing blocks from the set of blocks into the search stack until reaching the start block.

At block 512 the method can create a reverse stack that entails the blocks of the search stack in reverse order.

At block 514 the method can create a final stack.

At block 516 the method can initialize a last block to a top of the reverse stack.

At block 518 the method can push a current block onto the final stack until the current block is the last block.

At block 520 the method can output an ordered subset of the set of blocks that contribute to a time segment within the period of interest. In some cases, the ordered subset can be utilized to generate a visualization of the critical path that entails the subset of blocks and associated time segments along with the inter-relationships of the subset of blocks.

Figure 6:
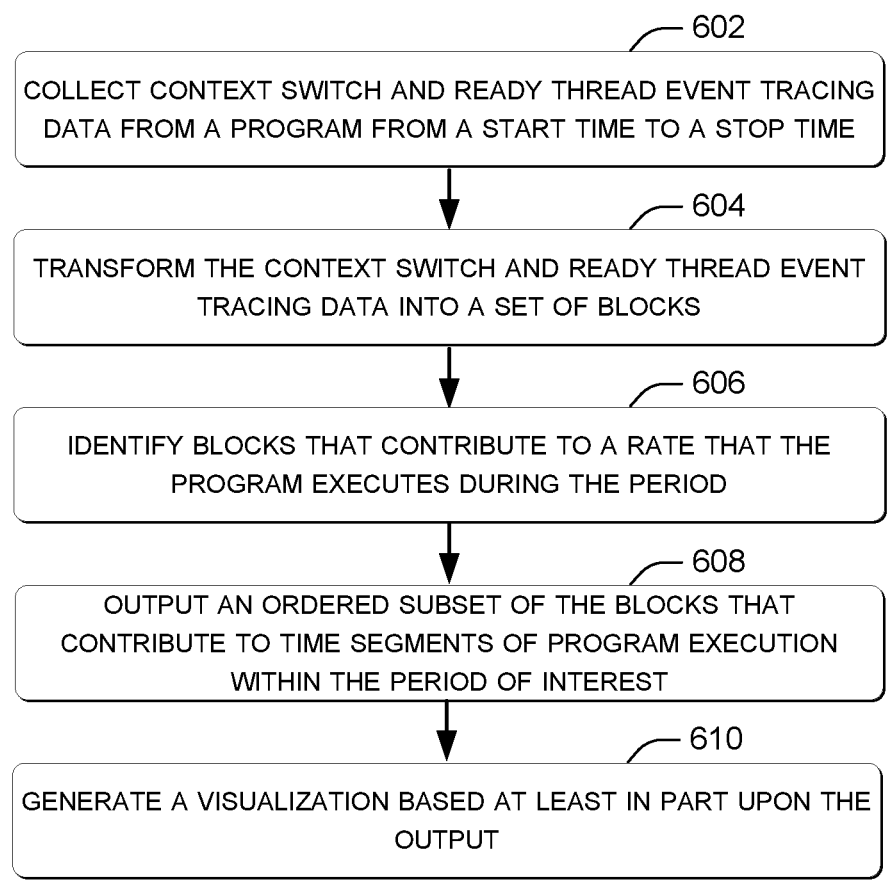

FIG. 6 shows a flowchart of a critical path technique or method 600.

At block 602 the method can collect context switch and ready thread event tracing data from a program from a start time to a stop time.

At block 604 the method can transform the context switch and ready thread event tracing data into a set of blocks where individual blocks represent times that threads were executing code segments of the program and timestamped links between individual blocks. Other information relating to the blocks can include transitions between blocks, dependencies, priorities, etc.

At block 606 the method can identify blocks that contribute to a rate that the program executes during the period.

At block 608 the method can output an ordered subset of the blocks that contribute to time segments of program execution within the period of interest.

At block 610 the method can generate a visualization based at least in part upon the output.

The described methods can be performed by the systems and/or elements described above and/or below, and/or by other devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Figure 7:
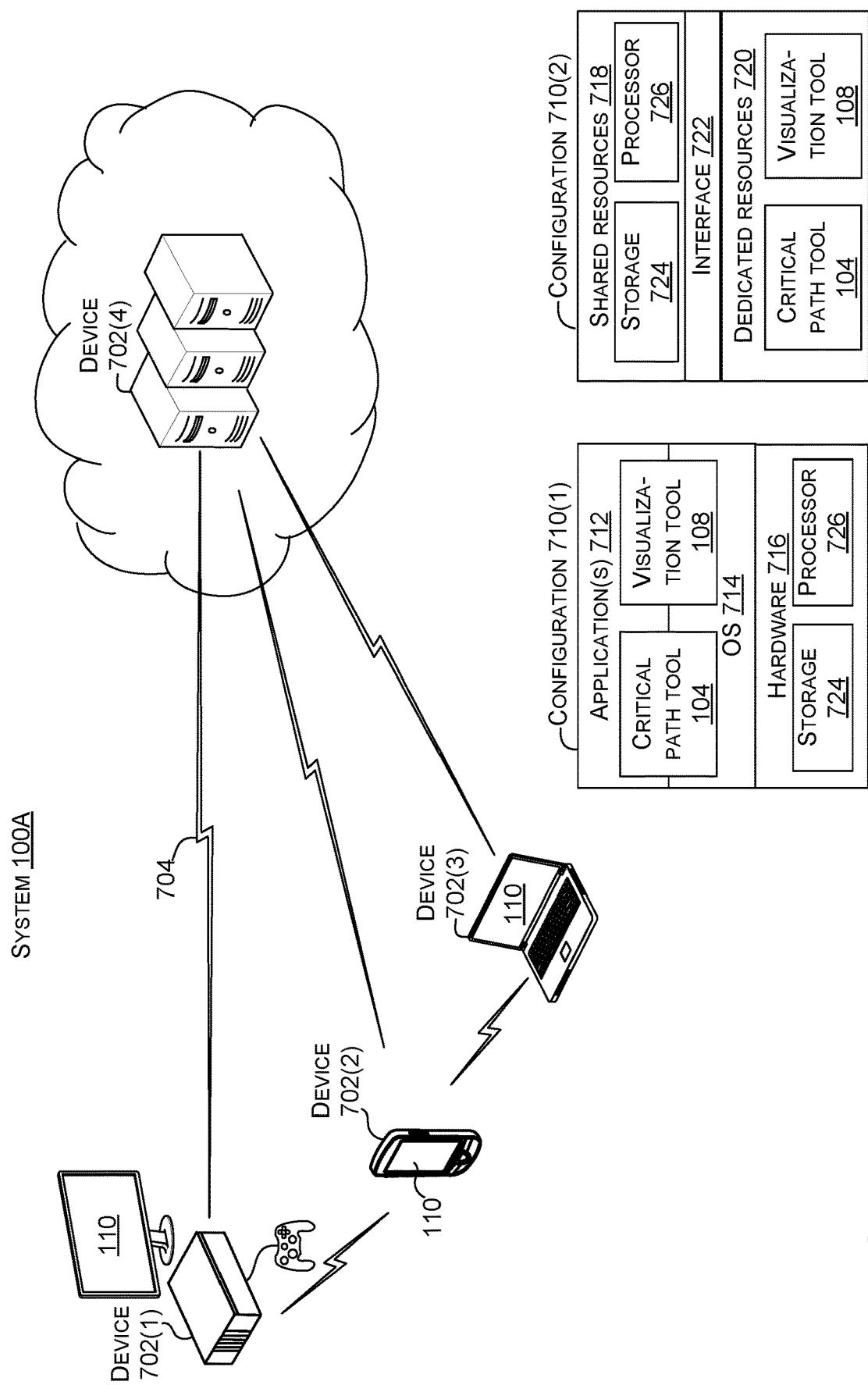

FIG. 7 shows another system 100A that can accomplish critical path concepts. For purposes of explanation, system 100A includes example devices 702. In the illustrated example, device 702(1) is manifest as a game console, device 702(2) is manifest as a smart phone, device 702(3) is manifest as a notebook computer, and device 702(4) is manifest as a server computer, such as may be employed in a datacenter or cloud resource. Devices 702 can be communicably coupled via one or more networks 704 represented by lightning bolts.

FIG. 7 shows two device configurations 710 that can be employed by devices 702. Individual devices 702 can employ either of configurations 710(1) or 710(2), or an alternate configuration. (Due to space constraints on the drawing page, one instance of each configuration is illustrated rather than illustrating the device configurations relative to each device 702). Briefly, device configuration 710(1) represents an operating system (OS) centric configuration. Configuration 710(2) represents a system on a chip (SOC) configuration. Configuration 710(1) is organized into one or more applications 712, operating system 714, and hardware 716. Configuration 710(2) is organized into shared resources 718, dedicated resources 720, and an interface 722 there between. In either configuration 710, the device can include storage/memory 724 and/or a processor 726.

Individual devices 702 can include an instance of the critical path tool 104 and/or an instance of the visualization tool 108. In some configurations, each of devices 702 can have an instance of the critical path tool 104 and/or an instance of the visualization tool 108. However, the functionalities that can be performed by critical path tool 104 and/or visualization tool 108 may be the same or they may be different from one another. For instance, in some cases, each device's critical path tool 104 and/or visualization tool 108 can be robust and provide all of the functionality described above and below (e.g., a device-centric implementation). In other cases, some devices can employ a less robust instance of the critical path tool 104 and/or of the visualization tool 108 that relies on some functionality to be performed remotely. For instance, device 702(4) may have more processing resources than device 702(3). As such, some of the functionality can be performed locally on device 702(3) and other functionality can be outsourced to device 702(4). Device 702(4) can return the results of its processing to device 702(3). In another example, the application 712 (e.g., program) may run on one device. The device's operating system may provide operating system root data about the application. This operating system root data could be sent to another device where the critical path tool is run on the operating system root data. A visualization tool can generate a visualization based at least in part upon data from the critical path tool and the visualization can be presented on any of these or a different device's display 110.

The critical path tool 104 residing on any of the devices 702 can utilize any of the described example algorithms and methods and/or other algorithms or methods to provide critical path information consistent with the present concepts.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 702 can include traditional computing devices, such as personal computers, desktop computers, servers, notebook computers, cell phones, smart phones, personal digital assistants, pad type computers, mobile computers, game consoles, entertainment consoles, smart devices etc. and/or any of a myriad of ever-evolving or yet to be developed types of computing devices.

As mentioned above, configuration 710(2) can be thought of as a system on a chip (SOC) type design. In such a case, functionality provided by the device can be integrated on a single SOC or multiple coupled SOCs. One or more processors 726 can be configured to coordinate with shared resources 718, such as memory/storage 724, etc., and/or one or more dedicated resources 720, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code (e.g., computer-executable instructions) can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a device implemented method, comprising: collecting context switch and ready thread event tracing data from a program over a period of interest, transforming the context switch and ready thread event tracing data into a set of blocks where individual blocks represent times that threads were executing and timestamped links between individual blocks when a first thread readied a second thread, calculating a start block and a stop block corresponding to start and stop times of the period of interest, pushing the stop block onto a search stack, iterating pushing blocks from the set of blocks into the search stack until reaching the start block, creating a reverse stack that comprises the blocks of the search stack in reverse order, creating a final stack, initializing a last block to a top of the reverse stack, pushing a current block onto the final stack until the current block is the last block, and outputting an ordered subset of the set of blocks that contribute to a time segment within the period of interest.

Another example can include any of the above and/or below examples where the iterating further comprises categorizing individual blocks as follow ready, follow previous, or done.

Another example can include any of the above and/or below examples where pushing the stop block onto a search stack comprises, while the search stack is not empty, treating a top block of the search stack as the current block.

Another example can include any of the above and/or below examples where in an instance where the current block comprises the start block, pushing the current block onto the search stack and exiting.

Another example can include any of the above and/or below examples where the method further comprises generating a visualization with the ordered subset of the set of blocks that contribute to a time segment within the period of interest.

Another example can include any of the above and/or below examples where the generating comprises generating a visualization that identifies code segments corresponding to the blocks and inter-relationships between the blocks as a critical path over the period.

Another example can include any of the above and/or below examples where the collecting comprises obtaining the context switch and ready thread event tracing data from an operating system event tracing process.

Another example includes a device implemented method comprising collecting context switch and ready thread event tracing data from a program from a start time to a stop time, transforming the context switch and ready thread event tracing data into a set of blocks where individual blocks represent times that threads were executing code segments of the program and timestamped links between individual blocks, identifying blocks that contribute to a rate that the program executes between the start time and the stop time, and outputting an ordered subset of the blocks that contribute to time segments of program execution between the start time and the stop time.

Another example can include any of the above and/or below examples where the collecting comprises receiving the start time and the stop time from a user or receiving a process of interest from the user and defining the start time and stop time for the process of interest.

Another example can include any of the above and/or below examples where the process of interest is a frame identified by the user.

Another example can include any of the above and/or below examples where the transforming comprises generating a reverse sequence of blocks executing on the threads beginning at the stop time and finishing at the start time.

Another example can include any of the above and/or below examples where the identifying comprises iteratively pushing individual blocks into a search stack in a reverse order from stop block to start block.

Another example can include any of the above and/or below examples where the method further comprises identifying individual context switches and their timepoints associated with transitions between the blocks of the reverse sequence.

Another example can include any of the above and/or below examples where the transitions comprise priority and preemption between the blocks of the reverse sequence.

Another example includes a system comprising storage configured to store computer-executable instructions and a processor configured to execute the computer-executable instructions to: collect context switch and ready thread event tracing data from a program over a period of interest, identify time blocks of program threads from the period of interest, and distinguish individual time blocks that contribute execution time to the period of interest from other individual time blocks that do not contribute execution time to the period of interest.

Another example can include any of the above and/or below examples where the processor is configured to obtain the context switch and ready thread event tracing data from an operating system on which the program is running.

Another example can include any of the above and/or below examples where the processor is configured to output an ordered subset of the individual blocks and associated time points that contribute to the execution time within the period of interest.

Another example can include any of the above and/or below examples where the processor is configured to generate a visualization that conveys the individual time blocks and associated time points within the period of interest.

Another example can include any of the above and/or below examples where the visualization identifies code sequences represented by the individual time blocks.

Another example can include any of the above and/or below examples where the visualization identifies a critical path through the code sequences that contribute to the execution time over the period of interest.

CONCLUSION

Although the subject matter relating to critical paths has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device implemented method, comprising:
    collecting context switch and ready thread event tracing data from a program over a period of interest;
    transforming the context switch and ready thread event tracing data into a set of blocks where individual blocks represent times that threads were executing and timestamped links between individual blocks when a first thread readied a second thread;
    calculating a start block and a stop block corresponding to start and stop times of the period of interest;
    pushing the stop block onto a search stack;
    iterating pushing blocks from the set of blocks into the search stack until reaching the start block;
    creating a reverse stack that comprises the blocks of the search stack in reverse order;
    creating a final stack;
    initializing a last block to a top of the reverse stack;
    pushing a current block onto the final stack until the current block is the last block; and,
    outputting an ordered subset of the set of blocks that contribute to a time segment within the period of interest.

2. The method of claim 1, wherein the iterating further comprises categorizing individual blocks as follow ready, follow previous, or done.

3. The method of claim 2, wherein pushing the stop block onto a search stack comprises, while the search stack is not empty, treating a top block of the search stack as the current block.

4. The method of claim 3, wherein in an instance where the current block comprises the start block, pushing the current block onto the search stack and exiting.

5. The method of claim 1, further comprising generating a visualization with the ordered subset of the set of blocks that contribute to a time segment within the period of interest.

6. The method of claim 5, wherein the generating comprises generating a visualization that identifies code segments corresponding to the blocks and inter-relationships between the blocks as a critical path over the period.

7. The method of claim 1, wherein the collecting comprises obtaining the context switch and ready thread event tracing data from an operating system event tracing process.

8. A device implemented method, comprising:
    collecting context switch and ready thread event tracing data from a program from a start time to a stop time;
    transforming the context switch and ready thread event tracing data into a set of blocks where individual blocks represent times that threads were executing code segments of the program and timestamped links between individual blocks;
    identifying blocks that contribute to a rate that the program executes between the start time and the stop time; and,
    outputting an ordered subset of the blocks that contribute to time segments of program execution between the start time and the stop time.

9. The method of claim 8, wherein the collecting comprises receiving the start time and the stop time from a user or receiving a process of interest from the user and defining the start time and stop time for the process of interest.

10. The method of claim 9, wherein the process of interest is a frame identified by the user.

11. The method of claim 8, wherein the transforming comprises generating a reverse sequence of blocks executing on the threads beginning at the stop time and finishing at the start time.

12. The method of claim 11, wherein the identifying comprises iteratively pushing individual blocks into a search stack in a reverse order from stop block to start block.

13. The method of claim 12, further comprising identifying individual context switches and their timepoints associated with transitions between the blocks of the reverse sequence.

14. The method of claim 13, wherein the transitions comprise priority and preemption between the blocks of the reverse sequence.

15. A system, comprising:
    storage configured to store computer-executable instructions; and,
    a processor configured to execute the computer-executable instructions to: collect context switch and ready thread event tracing data from a program over a period of interest, identify time blocks of program threads from the period of interest, and distinguish individual time blocks that contribute execution time to the period of interest from other individual time blocks that do not contribute execution time to the period of interest.

16. The system of claim 15, wherein the processor is configured to obtain the context switch and ready thread event tracing data from an operating system on which the program is running.

17. The system of claim 15, wherein the processor is configured to output an ordered subset of the individual blocks and associated time points that contribute to the execution time within the period of interest.

18. The system of claim 15, wherein the processor is configured to generate a visualization that conveys the individual time blocks and associated time points within the period of interest.

19. The system of claim 18, wherein the visualization identifies code sequences represented by the individual time blocks.

20. The system of claim 19, wherein the visualization identifies a critical path through the code sequences that contribute to the execution time over the period of interest.

\* \* \* \* \*